United States Patent [19]

Levy

[11] 4,150,559
[45] Apr. 24, 1979

[54] VARIABLE RATE TEST JOINT
[75] Inventor: Lloyd E. Levy, Princeton, N.J.
[73] Assignee: Ingersoll-Rand Company, Woodcliff Lake, N.J.
[21] Appl. No.: 890,607
[22] Filed: Mar. 20, 1978
[51] Int. Cl.² .................... G01L 3/18; G01L 25/00
[52] U.S. Cl. ........................................ 73/1 C; 73/135
[58] Field of Search .................... 73/1 C, 134, 135

[56] References Cited
U.S. PATENT DOCUMENTS

| 3,007,336 | 11/1961 | Livermont | 73/134 |
| 3,382,710 | 5/1968 | Aubeges et al. | 73/135 |
| 3,999,426 | 12/1976 | Sonderegger | 73/134 |

FOREIGN PATENT DOCUMENTS

| 429294 | 1/1975 | U.S.S.R. | 73/134 |
| 442391 | 6/1975 | U.S.S.R. | 73/1 C |

Primary Examiner—Charles A. Ruehl
Attorney, Agent, or Firm—Walter C. Vliet

[57] ABSTRACT

A device for simulating the tightening rate of a threaded fastener and for varying the joint rate. The torque applied to the joint is determined. The device is suitable for determining the torque scatter of the torque applied to the simulated joint by means of a torque applying device, such as a pneumatic power angle wrench or nut runner.

8 Claims, 3 Drawing Figures

VARIABLE RATE TEST JOINT

BACKGROUND OF THE INVENTION

Many systems have been proposed for testing nut runner torque control. A problem exists in torque control over a wide range of varying joint rate. Joint rate may be defined as the relative amount of rotation required to bring the threaded fastener to its final torque after the fastener has been seated. Very hard joints require little rotation. Soft joints require considerably more rotation to achieve the desired torque. Thus, a device for testing the torque output of a nutrunner should be capable of simulating the joint rate response of different threaded fasteners. A low joint rate or slow torque buildup is typical of a gasketed joint, and a high torque rate or rapid torque buildup is typical of metal to metal connections employing threaded fasteners.

Most test devices to date have employed a threaded fastener in the simulated joint. This introduces the variable of friction in any determination of applied torque. This variable results in scatter of torque results, and additionally the fastener must be backed off after each run. This is, of course, time consuming. The test apparatus should have much less scatter than the device to be tested to provide a good reliable test. Threaded joints generally exhibit too much scatter for testing modern tools.

A recent improvement in test joints has employed the use of a torsion bar spring and a fast acting brake. This simulates a hard joint quite well. However, to date, attempts to simulate a soft joint have been only moderately successful and lack the degree of variability desirable in a test joint apparatus. In the past, most means of simulating soft joints have consisted of rubber torsion tubes and/or steel coil springs. These devices suffer generally from secondary vibration modes and short cycle life. In addition, their use requires additional components in the test joint.

The object of the present invention is to provide a variable rate test joint which is simple, reliable, accurate, reproducible, and easy to use.

It is a further object of the present invention to utilize an interchangeable solid torsion bar to simulate various, fixed hard joint rates and to utilize a modulated air brake in combination with the torsion bar to simulate soft joint rates.

It is a further object of this invention to provide a means for measuring the torque applied to the test joint.

It is a further object of this invention to prevent the joint from unwinding once the torque applying device is shut off to prevent possible damage to the tool being tested.

It is a further object of this invention to provide a means for manually checking by means of a beam torque wrench or similar device the accuracy of the applied torque.

It is a further object of this invention to produce a variable rate test joint which is economical to build, operate, and maintain.

These and other objects are obtained in an apparatus comprising: a support, a brake attached to the support, a one-way clutch attached to the support and spaced apart from the brake, a torsion spring engaged with and mounted between the brake and the one-way clutch for rotation with the clutch and the brake, a means for actuating the brake, and a means for measuring torque applied to the torsion spring at its one-way clutch engaging end.

DESCRIPTION OF THE PREFERRED EMBODIMENT

Figure 1:
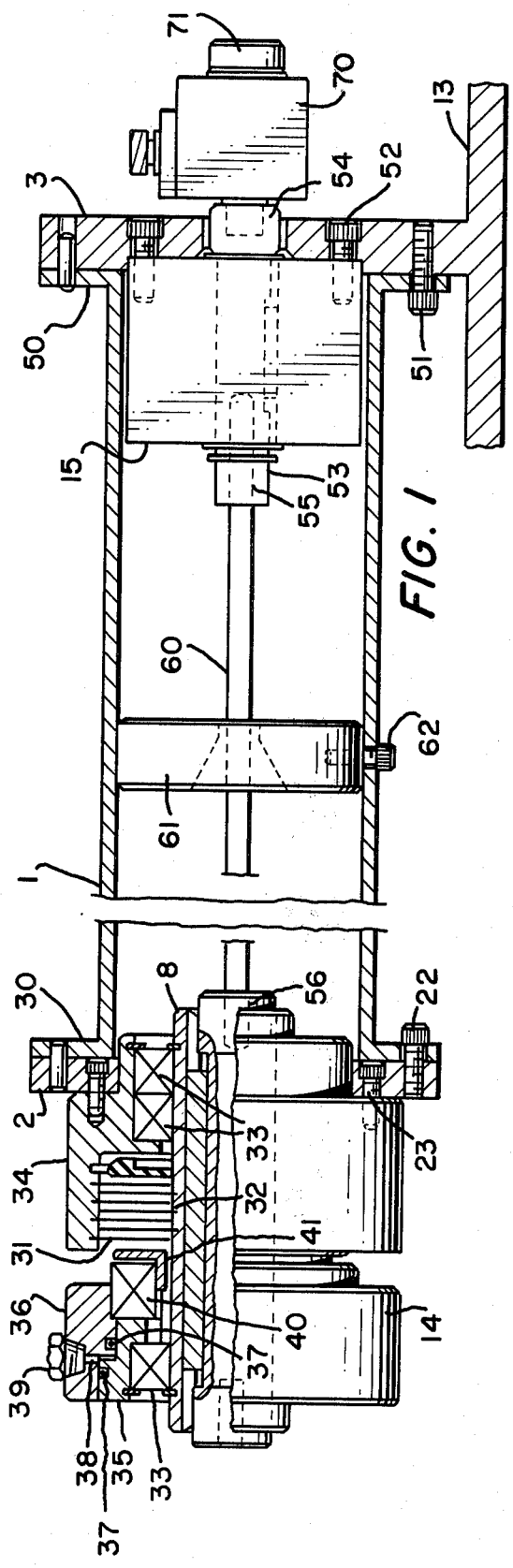
FIG. 1 is a cross sectional side elevation of the variable rate test joint.

The objects and operation of the apparatus according to the invention may be better understood by referring to the drawings and the following description.

In FIG. 1, the apparatus for the variable rate test joint is shown. A support tube 1 serves as a base or mounting device for the various components of the tester. The support tube in turn may be mounted on a suitable base plate 13, which in turn may be mounted on a test stand or work bench (not shown). At one end of the support tube 1, which may be referred to as brake or back end of the tester, is a brake mounting plate 2, which is attached by means of suitable fasteners 22, such as a cap screws, to a back flange 30 which is securely attached to the support tube by welding or similar means.

An air operated brake device 14, similar to a Horton high torque brake, Model No. 4H35P-H, manufactured by Horton Manufacturing Company of Minneapolis, Minn., is mounted by threaded fasteners 23 to the brake mounting plate as shown. The rotary shaft element 8 of the brake forms a torsion bar anchor spindle. The shaft element or spindle 8 is mounted for rotation on bearings 33 within the brake body. A series of friction discs 31 are splined to the brake body. A series of steel discs 32 are interleaved with the friction discs and splined to the spindle 8. The torsion bar anchor spindle 8 is mounted for rotation on bearings 33 within the main body 34 of the brake and subbody 35 of the brake. A slidable collar 36 surrounds subbody 35 mating with the differential diameters of subbody 35 and sealed by "O" rings 37 so as to form an external piston which is slidable to the right as shown on FIG. 1 in response to air pressure being applied to chamber 38. Air pressure is applied to chamber 38 through air fitting 39. Displacement of slidable collar or piston 36 to the right also forces throw out bearing 40 to the right, which in turn displaces clutch pressure plate 41 to the right thereby compressing the interleaved friction discs 31 and steel discs 32. This produces the braking action required on torsion bar anchor spindle 8.

The design of the brake permits free running of the spindle until such time as air pressure is applied to air fitting 39. The design further permits rapid positive braking in response to the applied air pressure. The braking action is proportional to the applied air pressure.

At the other end of the support tube, which may be referred to as the drive or front end of the tester, is a clutch mounting plate 3. The clutch mounting plate 3 is attached to a front flange 50 by means of suitable fasteners 51, such as cap screws. A one-way clutch 15 is mounted on clutch mounting plate 3 by suitable fasteners 52, such as cap screws. The one-way clutch permits rotation of the testing device in one direction only. Its use will be later described. The one-way clutch may be similar to a Formsprag clutch, Model No. FSO-400, manufactured by Formsprag Division of Dana Corporation of Warren, Mich.

A drive spindle 53 is mounted within the one-way clutch for rotation therein. The drive spindle is provided typically with a ½" square drive 54 at its front and a suitable torsion bar square drive 55 at its rear end. The spindle 8 is similarly provided with a torsion bar square drive 56. Disposed within the torsion bar square drives 55 and 56, and extend from the drive spindle 53 to the anchor spindle 8 is a suitable torsion bar 60.

In the embodiment shown, the torsion bar is of square cross section. The square cross section is chosen to reduce torsional oscillations and is sized to simulate the predetermined highest joint rate to be tested. The torsion bar is readily replaceable for various high joint rate ranges.

A torsion bar guide 61 is disposed within the support tube at approximately the center location to aid in centering the torsion bar during installation. The torsion bar guide is secured within the support tube by means of a threaded fastener 62, such as a cap screw.

The torque applied to drive spindle 53 in normal operation is determined by means of a rotating socket wrench torque transducer, such as a model 1253 rotating socket wrench torque sensor, manufactured by Lebow Associates, Inc., 1728 Maplewood Road, Troy, Mich. A suitable electronic readout is provided to measure the strain gage output of the torque transducer. Typically, this may be read to the nearest 1/10 of a foot pound. The electronic circuit may consist of a bridge balance amplifier, filter, peak hold circuit, converter, and digital display with external reset, such as available from Daytronic Corporation, Miamisburg, Ohio. Torque may be measured by any other convenient means familiar to one skilled in the art, such as a strain gage torque transducer applied to the support tube which would read the reaction torque applied to the torsion bar.

In operation, the torque transducer 70 is inserted in the ½" square drive 54. A torque producing device to be tested is coupled to the torque transducer by means of a suitable connection, such as a ½" square drive 71. Typically, the torque producing device to be tested is rotated clockwise at the desired operating speed. Upon signal of the operator, air pressure is applied to brake 14 which stops rotation of the anchor spindle 8. The torque produced then winds up torsion bar 60 until the torque producing device is stalled or shut off.

As can be appreciated by one skilled in the art, the one-way clutch 15 prevents reverse or counterclockwise rotation of the drive spindle at stall and or shut off. The peak torque can be read out from the torque transducer and in addition is stored within the torsion bar 60 until the brake 14 is released. This permits checking of the torque transducer readout by measurement of the angular displacement of the torsion bar anchor spindle in relationship to the drive spindle or by means of a device, such as an optical angular encoder. Torque may also be checked with a torque wrench. In the case of torque wrench, torque would be applied to the clockwise direction to drive spindle 53 clockwise until the point of rotation of the spindle. The torque at the point of rotation would be measured and would represent the applied torque at stall.

Release of the torsion bar is accomplished by simply releasing air pressure on brake 14. The device is then ready for subsequent testing.

Checking of the torque apparatus is, of course, necessary only to confirm the readout from the torque transducer. Once accuracy of the torque transducer is established, it may be utilized directly.

As one skilled in the art can appreciate, the high joint rate as established by the flexibility rate of the torsion bar may be rapidly and conveniently repeated without need for a threaded joint or the need to reverse the drive.

Where it is desirable to test at a lower joint rate, the applied air pressure rate may be modified to accomplish any joint rate less than the high joint rate.

Figure 2:
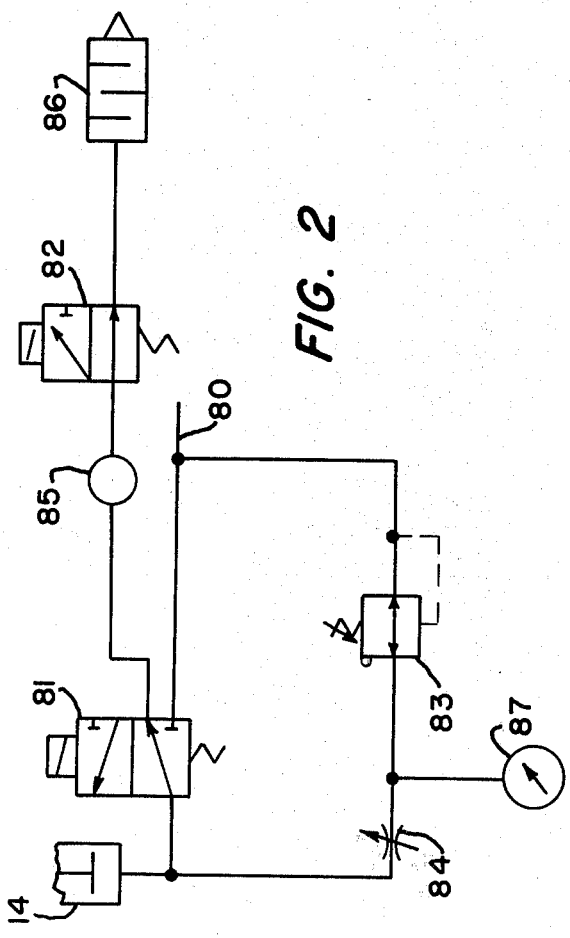
FIG. 2 is a schematic of the modified air supply to the air brake.

FIG. 2 shows a schematic of the air supply to the brake to accomplish the variable joint rate. Referring to FIG. 2, the air supply system consists of an 120 p.s.i. instrument air supply 80, a fast acting large orifice three-way solenoid valve 81, a normally open two-way solenoid valve 82, a pressure regulator 83, an adjustable orifice 84, a fixed volume chamber 85, a muffler 86, and a pressure gage 87.

To apply the high joint rate, a signal is given to fast acting valve 81, the large orifice accomplishes a rapid pressure rise directly to the brake coming up to full supply pressure within approximately 3 milliseconds locking the brake without slippage. Torque is built up in the torsion bar, the joint rate being same as the spring rate of the bar. Peak torque is displayed by the electronic circuitry associated with the torque transducer 70 and recorded by an operator. By proper design, the joint rate can be made to vary less than 5 percent. This is an important requirement of the high rate joint to insure accurate testing. To reset the test apparatus, the signal to the fast acting valve 81 is stopped and the brake will bleed to atmosphere through fixed volume chamber 82 and muffler 86. The operator then resets the torque readout and is ready to retest.

During normal operation of the tester, a small amount of air flows from the air supply 80 through pressure regulator 83 and adjustable orifice or metering valve 84 passing valve 81 through the exhaust port. The air then flows through the fixed volume chamber 85 and out normally opened two-way valve 82 into the atmosphere by way of muffler 86. The metering orifice is about 0.25 percent of the valve orifice area of valve 81 and has little or no effect on hard joint operation. No pressure is built up due to the small size of adjustable metering orifice 84 compared to the exhaust area of two-way valve 10.

To apply a soft joint rate, the tester is operated as follows: After an initial interval of free speed operation of the tool, the operator simulates a soft joint by energizing two-way valve 82. A closed volume is formed by those components between adjustable orifice 84 and two-way valve 82. The pressure rise in this volume, and consequently the torque rise as this pressure is applied to the brake is an approximate function of the square root of time. This exponential function closely approximates the ideal torque build up of a low rate joint. By adjusting metering orifice 84, any rate within normally usable limits may be obtained (generally ½ to 3 turns to full torque). Once the rate is set by adjustable orifice 84, it will vary only a small amount from test to test and very little brake temperature rise is caused by the small amount of slippage.

Figure 3:
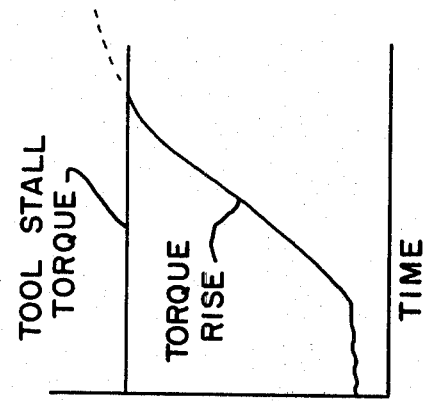
FIG. 3 is a plot of the brake torque versus time which may be achieved with the apparatus.

Pressure regulator 83 is set to a pressure that will always stop the tool under test. Adjustable orifice 84 may then be used to set the joint rate. If the pressure regulator is set too high, it will tend to flatten the joint rate curve shown on FIG. 3. The curve will tend more towards the straight line during the torque rise. Setting the pressure regulator as close to the minimum pressure required to brake the tool at full torque produces more curve to the pressure buildup as shown on FIG. 3. This is considered to be desirable as it more closely simulates actual joint rates observed on tools driving joints with linear spring rates.

The tester described in this embodiment simulates adjustable low joint rates and accurately fixed high joint rates having practically no frictional variation in a simple package which provides a rapid, accurate means of testing nut running tools. A feature of the embodiment is the concentric orientation of the torsion bar, brake, one-way clutch, and support tube. This arrangement provides exceptional torsional and bending stability and retains the parts in axial alignment during torsional buildup. The torsion bar guide 61 aids interchanging of torsion bars.

The apparatus may be checked by conventional beam torque wrench as previously described, and tests may be performed in rapid succession without the need for lubricating threaded joints or backing off the joint or the need for troublesome rubber torsion tubes and/or steel coil springs.

While applicant has described his invention in terms of the above embodiment, he does not wish to be limited in the scope of the invention except as claimed.

I claim:
1. Variable rate test joint comprising:
a support;
a brake attached to said support;
a one-way clutch attached to said support and spaced apart from said brake;
a torsion spring engaged with and mounted between said brake and said one-way clutch for rotation with said clutch and said brake;
a means for actuating said brake; and
a means for measuring torque applied to said torsion spring at its one-way clutch engaging end.
2. The apparatus of claim 1 wherein:
said brake is applied by air pressure.
3. The apparatus of claim 2 wherein:
the means for actuating said brake further comprises means for controlling air pressure and applying it at a controlled rate to simulate varying joint hardness.
4. The apparatus of claim 3 wherein:
said air pressure is rapidly applied by said means for controlling air pressure to simulate a hard joint.
5. The apparatus of claim 4 wherein:
the rate of the hard joint is determined by and approaches the torsion spring rate.
6. The apparatus of claim 3 wherein:
said means for controlling air pressure further comprises a variable flow, constant pressure supply of pressure fluid and a fixed volume which is pressurized by said variable flow constant pressure supply.
7. The apparatus of claim 1 wherein:
said support, said brake, said one-way clutch and said torsion spring are in concentric orientation to eliminate bending in the apparatus during test.
8. The apparatus of claim 1 wherein:
said support is a cylindrical tube and said means for measuring torque comprises torque transducer mounted on said cylindrical tube.

* * * * *